Jan. 14, 1969 W. JASTRZEMBSKI 3,422,334
DRIVE CONTROL FOR A D.C. MOTOR
Filed Aug. 16, 1965 Sheet 1 of 6

INVENTOR.
WALFRIED JASTRZEMBSKI
BY
Attorney

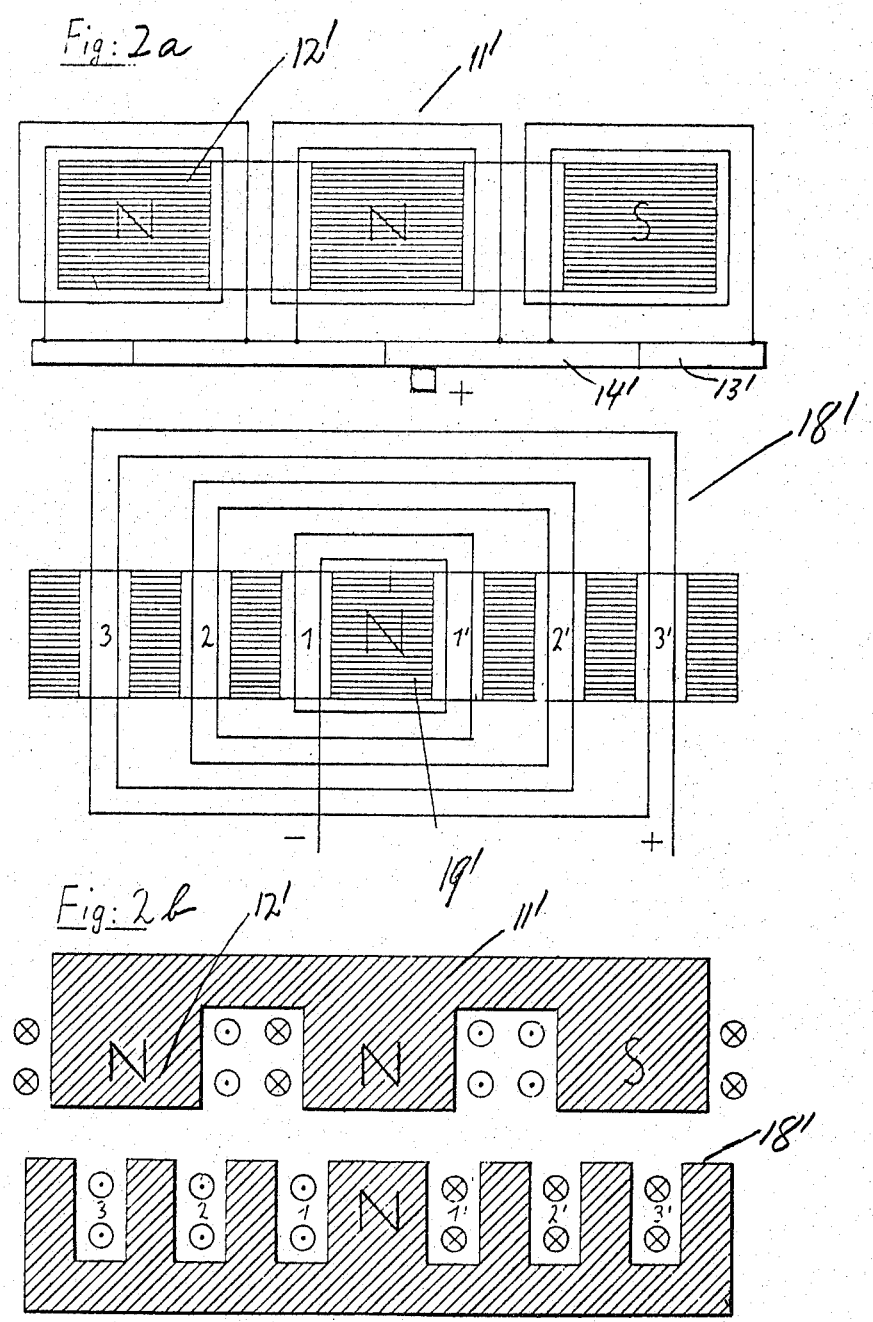

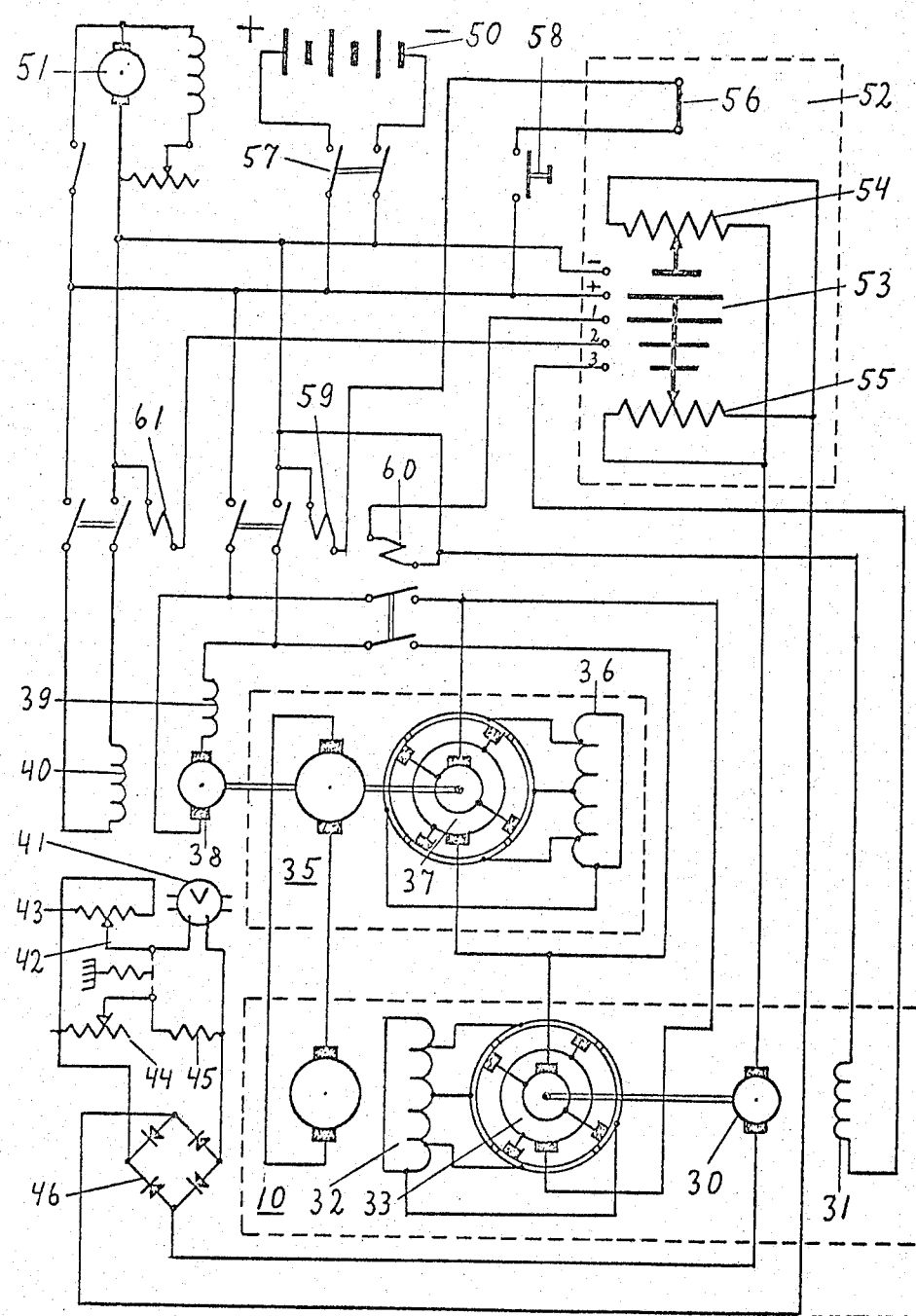

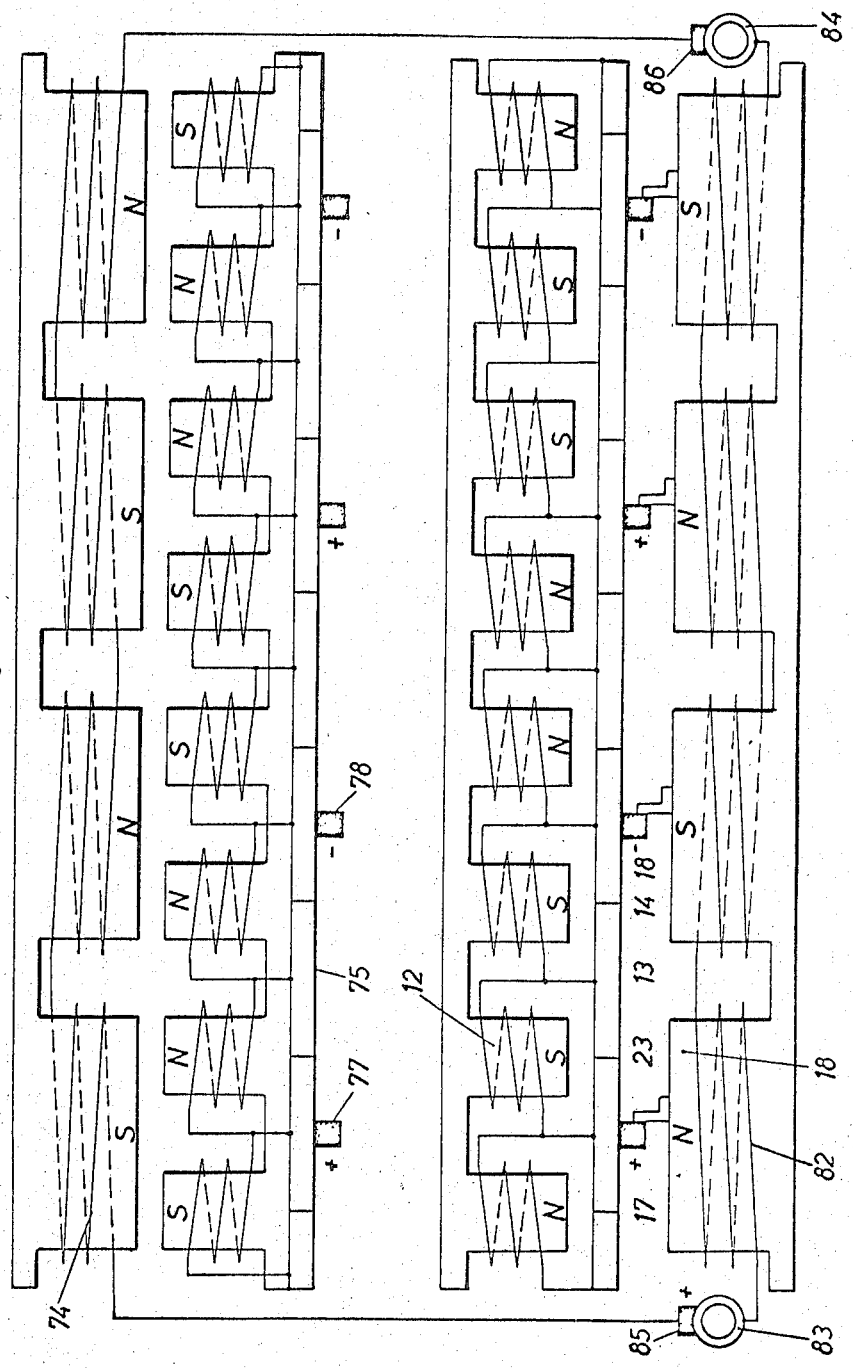

United States Patent Office 3,422,334
Patented Jan. 14, 1969

3,422,334
DRIVE CONTROL FOR A D.C. MOTOR
Walfried Jastrzembski, 77 Indian Grove,
Toronto 3, Ontario, Canada
Filed Aug. 16, 1965, Ser. No. 479,737
Claims priority, application Germany, Aug. 17, 1964,
J 26,412
U.S. Cl. 318—439    4 Claims
Int. Cl. H02k 13/00; H01r 39/46

ABSTRACT OF THE DISCLOSURE

The individual windings of the stator are energized via a stationary commutator and spring-biased brush arms to give a stator pole of like polarity facing an aligned rotor pole, the stator poles exceeding the rotor poles in number by an integral multiple of the number of rotor poles; the immediately forward stator pole having a polarity opposite to that of the aligned poles, the immediately rearward stator pole having a polarity equal to that of the aligned poles. The brush arms are rotated by a variable speed motor for control purposes, but are limited in their rotation relative to the rotor by stops mounted on either side on the rotor.

---

This application relates to a D.C. motor and to a drive control for said motor.

In summary, the drive control of this invention for a D.C. motor comprises a D.C. motor having a stator and a rotor, the windings of the stator being connected to individual separate sectors of a stationary commutator. The brushes for the stationary commutator are connected to slip rings mounted on the rotor, and the brushes are mounted for rotation with the rotor. The brushes are aligned to come into contact with the commutator in such a manner that each rotor pole always faces a stator pole having the same denomination. The number of stator poles is an integral multiple of the number of rotor poles. The brushes of the stator commutator are drivingly connected to a second D.C. variable speed motor, and the rotor has stop means mounted thereon for limiting the relative rotation of the brushes of the stator commutator with respect to the rotor.

Control devices for a D.C. motor have been previously disclosed wherein the windings of the stator are connected to individual sectors of a stationary commutator or collector, these sectors being spaced from one another; brushes rotating with the rotor engage this commutator in such a manner that each rotor pole always opposes a stator pole of the same demonination, the number of the stator poles being an integral multiple of the number of rotor poles. Furthermore, in previously disclosed D.C. motors, the brushes of the stator commutator emanating from the slip rings provided on the rotor are drivable by an additional D.C. variable speed motor.

The present invention relates to an improvement in the above-described control and its application, particularly to diesel electric drives wherein the D.C. motor is connected to a generator. In order to prevent the brushes of the stator commutator from running away from the rotor of the D.C. motor, i.e. in order to keep them in phase, according to this invention, stops are provided at the rotor of the D.C. motor which limit the relative rotation of the brushes of the stator commutator with respect to the rotor. Basically, it is necessary that only one of the brushes, which are rigidly combined to form a group, is positioned between two stops. However, preferably each brush is provided between two stops in order to equalize the load of the rotor. According to the invention, the brushes are supported at the stops by means of springs and are biased such that their position is neutral.

Preferably, the D.C. motor is employed in conjunction with a generator driven by an internal combustion engine and constructed in the same manner as the D.C. motor.

The variable speed motor of the D.C. motor is preferably a shunt-wound electric motor whose rotor is connected in series with a control device influencing the generation of current. In a further development, the control resistor, a variable resistor, has two oppositely displaceable sections one of which is connected in series with the control device. The other section is connected in parallel, together with a balancing resistor, to the control device, so that the total resistance in the rotor circuit of the variable speed motor is constant. If the generator is driven by an internal combustion engine, the control device can be a magnetic valve controlling the fuel feed.

It is the object of this invention to provide a D.C. motor drive control which is highly effective for use with internal combustion engine-generator systems.

Further advantages and features of the invention can be derived from the following detailed description and from the drawing wherein a preferred embodiment is shown and illustrated as an example.

FIG. 2a shows a schematic view of the stator and rotor poles of the motor of FIG. 2.

FIG. 2b is a schematic view, in section, of the stator and rotor poles of the motor according to FIG. 2.

FIG. 3 is a circuit diagram for a diesel electric drive, employing a D.C. motor according to FIG. 1.

FIG. 5 is a schematic view of the circuit connection between the D.C. generator and the D.C. motor in the drive according to FIG. 3.

Figure 1:
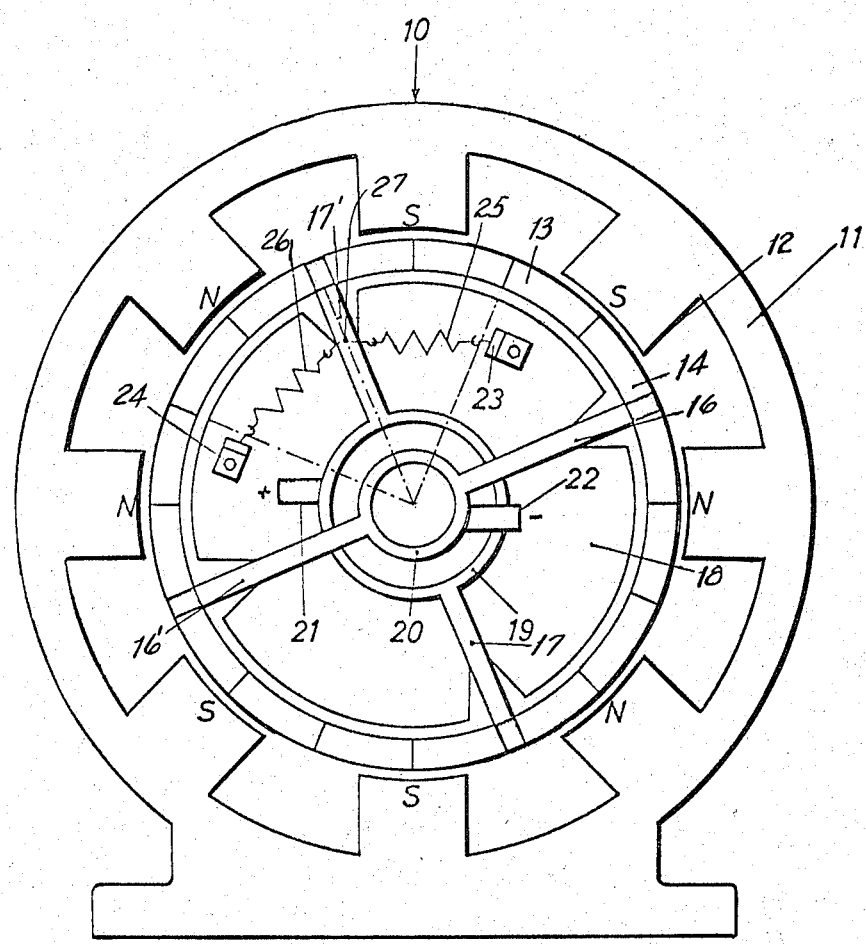
FIG. 1 shows a schematic view of a D.C. motor with a speed control device according to the invention in the neutral position.

FIG. 1 is a schematic diagram of the D.C. motor of the present invention. The stator 11 is provided with poles 12 which conventionally carry windings positioned in a series closed upon itself. These windings are supplied with current by means of a commutator composed of sectors 13, 14. For this purpose, a connection leads from each commutator sector 13, 14 to the winding of the stator pole positioned at these sectors.

The stator commutator is divided into sectors 13, 14 and is supplied with current by brushes 16, 17 fixedly attached to the slip rings 19, 20; the slip rings are connected with a current source by means of brushes 21, 22. The number of rotor poles 18 is half the number of stator poles 12. The windings, not shown, of the rotor poles 18 are likewise connected to the slip rings 19, 20. A variable speed motor is incorporated in the D.C. motor for rotation of the slip ring arrangement 19, 20.

In order to insure that the brushes 16, 17 do not run away from the rotor of the D.C. motor, or lag behind, stops 23, 24 are provided on the rotor in accordance with the invention. These stops are provided, in FIG. 1, on both sides of the brush arm 17' at a certain angular distance, in the present case about 45°. The stops 23, 24 are connected with the brush arm 17' by means of springs 25, 26. The springs 25, 26 have the same size and the same force. The points of attachment of the springs at the stops 23, 24 have the same radial distance from the axis of the motor. The two springs 25, 26 are attached to the brush arm 17' either at the same point 27 in the center of the brush arm, or at two points symmetrical with respect to each other in relation to the longitudinal axis of the brush arm.

The oppositely positioned brush arms are rigidly connected with each other. Consequently, it would be sufficient to provide stops for only one brush arm. For a better balancing of the rotor, however, it is preferred to provide stops for each brush arm. However, the stops can be constructed such that, for example the stop 23 is used for the brush arm 17' as well as for the brush arm 16. Thus, only one stop need be provided on each rotor pole 18, this stop being usable by the next adjacent brush arms to the left and to the right thereof.

The D.C. motor 10 is to be operable in both directions of rotation. For this reason, two stops are provided for each brush. During unidirectional operation, one stop is sufficient for each brush. Thus, for right-hand rotation, only the stop 23 and the spring 26 could be provided for the brush arm 17', the spring being mounted to the stop 24 which, in this instance, would limit the leading of the brush arm 16'. Upon left-hand rotation, the brush arm 17' could move up to the stop 24, the return spring 25 making it possible to retrieve the brush because this spring is provided between the brush arm 17' and the stop 23 intended for the preceding brush arm 16'.

Figure 2:
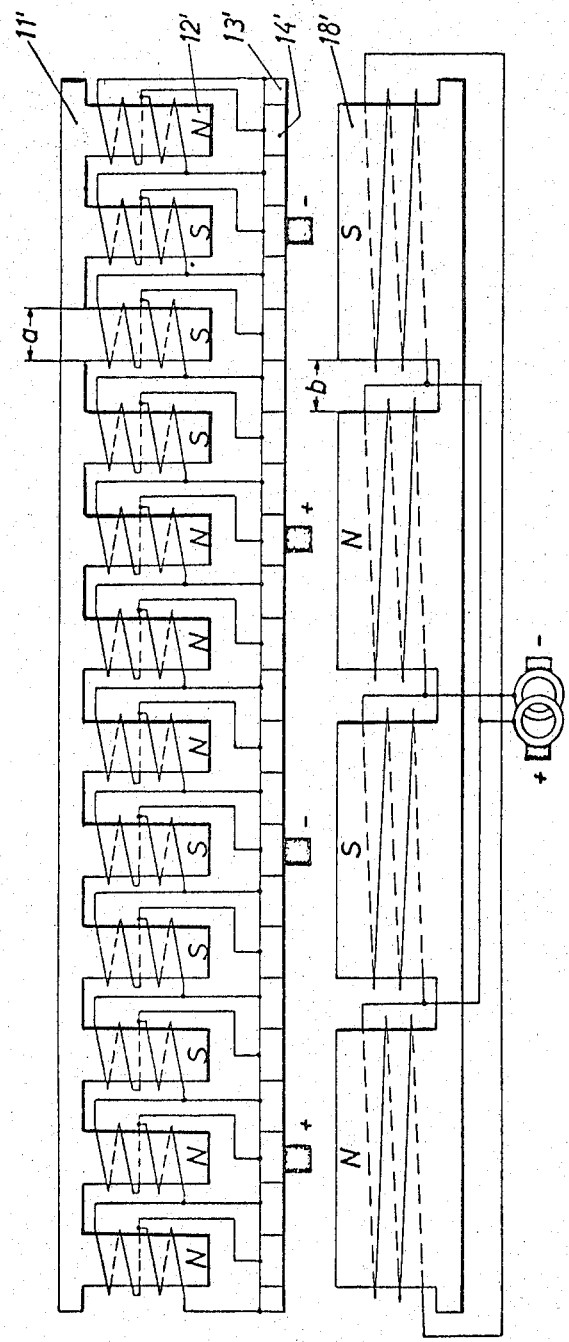
FIG. 2 is a schematic view of a D.C. motor as shown in FIG. 1, but wherein the ratio of stator poles to rotor poles is 3:1.

For the sake of simplicity, a motor is illustrated in FIG. 1 wherein the number of the stator poles is double the number of the rotor poles. In contradistinction thereto, FIG. 2 shows an embodiment wherein the number of the stator poles is a larger integral multiple of the number of the rotor poles. The stator 11' of the motor according to FIG. 2 is provided with a total of 12 poles 12', three of which are positioned opposite a rotor pole 18'. On each stator pole 12', two coils are mounted whose beginning and end portions are respectively connected with a sector 13', 14', of the stator commutator. The coils of the stator poles, by the way, are connected in series. The number of the segments of the stator commutator corresponds to the number of coils on the stator poles. By increasing the number of coils, the short-circuit voltage is correspondingly reduced.

In an embodiment where the stator has twice as many poles as the rotor and the pole windings are constructed as simple coils so that one rotor pole winding has the same breadth as two stator pole windings, no counter electromotive force is induced in the stator winding. Therefore, in this embodiment, the rotor field does not have any influence upon the current in the stator winding and thus upon the commutation. This effect likewise occurs at corresponding multiples of the coils, poles, and breadth relationships. However, in the rotor, the counter electromotive force necessary during operation is induced. Therefore, the breadth $a$ of the stator pole (see FIG. 2) should not, in practice, exceed the spacing $b$ of two rotor poles.

In a preferred embodiment as shown in FIG. 2a and FIG. 2b, the poles of the rotor are provided with grooves and the pole windings are inserted into the grooves. In FIG. 2a and FIG. 2b, three stator poles 12' are illustrated at the top facing a rotor pale 18'. While the stator poles 12' are provided with simple coils, the rotor pole 18' is provided with a type of helical or spiral winding. The starting portion of the wire of the rotor pole winding is inserted in groove 1, is then passed to groove 1', and back again to groove 1. The grooves are dimensioned such that they are filled by the windings. Thereafter, the wire is passed to groove 2 and from there to groove 2'. After these two grooves are filled with windings, the grooves 3 and 3' are provided with windings. The starting end of such a winding is connected with the end of the preceding pole winding, and the end of such winding with the beginning portion of the subsequent pole winding. The innermost armature tooth 19' of a rotor pole 18' can be somewhat broader than the outer armature teeth so that the width of the coil having the innermost position does not become too small. In case of a D.C. motor used as the generator, it is also possible to provide such a spiral winding; as the generator is an inner pole generator, the stator is provided with the spiral winding.

This feature of providing the rotor or stator poles with grooves is advantageous in several respects. For example, a generator shall be considered wherein, as it is an inner pole machine, the stator poles are provided with grooves, the stator winding being provided in these grooves. If the stator pole is fashioned as a massive iron block around which a winding is placed, the lines of force exit from the rotor north pole, pass through the massive stator pole, and again enter the rotor at the south pole; they do not intersect any winding turns of the stator pole winding, so that no voltage is induced in the winding. In contradistinction thereto, if the stator pole is provided with grooves wherein the winding is inserted, the lines of force intersect the turns and induce a voltage therein. In the motor, the rotor poles are provided with grooves which receive the winding. Thereby the counter electromotive force required during operation is induced in the rotor pole winding. In the motor provided with the speed control, the counter electromotive force is then practically zero when the brushes are in the neutral position and the rotor is rotating. The counter electromotive force reaches its highest value when the brushes contact the stops. This means that during the warming-up period a stronger starting torque is achieved because of the lower counter electromotive force. For purposes of constructing the device in practice, it is possible to employ, in place of a spiral winding, also a lap or loop winding, or a wave winding. However, the spiral winding has the advantage, as compared to the other two types of winding, that the portions of the winding lying outside of the grooves and not taking part in the generation of current in the generator are shortest and thus the losses in copper are smaller. Also the weight of a spiral winding is less than that of the other types of winding.

If, in the motor, the stator winding is connected in parallel to the rotor winding, or is connected to an outside current source, the winding is made of thin wire with a large number of turns. Contrary thereto, in a series-wound motor, the rotor winding must be fashioned as an open winding. All of the pole windings of the rotor are then series-connected, so that there is only a beginning present, and one end. In this case, for example, the beginning of the rotor winding is connected with a slip ring, and the end is connected with a brush arm, the other brush arm being connected with the second slip ring. The terminal voltage is applied to the two slip rings. Because of the series connection of stator winding and rotor winding, the stator winding, in this embodiment, must be made of thick wire. There is the disadvantage, in comparison to the parallel-connected winding, that the commutator and the brushes must be constructed of greater thickness, and that the amperage or current intensity in the stator winding and at the commutator is dependent upon the counter electromotive force in the rotor winding.

FIG. 3 shows the arrangement of a D.C. motor according to FIG. 1 in the combination of a diesel electric drive. In the schematic representation of FIG. 3, the motor 10 is provided with a stator winding 32 and a slip ring and brush arrangement 33 constructed as described above. The D.C. motor 10 is connected with a variable speed motor 30 which is suitably incorporated into the D.C. motor. The variable speed motor 30 is provided with a shunt excitation winding 31.

The D.C. motor 10 is connected to a generator 35. The latter, in turn, is provided with a stator winding 36 and a slip ring and brush system 37 of the construction described above. The generator 35 has an exciter generator 38 which is fashioned as a compound-wound generator, has an exciter winding 39 series-connected with the armature, and has a shunt exciter winding 40.

An electromagnetic valve 41 is connected in series with the variable speed motor 30, this valve controlling the fuel feed for the diesel engine, not shown, which drives the generator 35. A variable resistor or potentiometer 42 serves to set the magnetic valve 41, this resistor being divided into two equal branches 43 and 44 which can be oppositely adjusted. These branches are positioned in parallel to each other in such a manner that the branch 43 is in series with the magnetic valve 41 and the branch 44 is in series with a compensating resistor 45. In this arrangement, the total resistance of components 41, 42 and 45 does not change, no matter how the resistance relationships at branches 43 and 44 of the potentiometer 42 are divided. A rectifier 46 is connected in front of the valve arrangement and renders the latter independent of the direction of current.

For operating the system, a battery 50 is necessary for supplying the current required for starting the motor. The battery can be recharged by way of an auxiliary generator 51. A control device 52 is provided with two resistors 54 and 55, as well as a switchgear panel 53. The control device 52 furthermore contains a contact 56 which is closed in the neutral position of the control device and is opened when the control device is actuated.

For starting-up the motor, the switch 57 is first closed, connecting the battery 50 to the system. Thereupon, the starting contact 58 is manually switched into its connecting position so that the current from the battery flows by way of switch 57, the starting contact 58, the control contact 56 to the starting contactor or fuse 59 and from there again back to the battery 50. Thereby, the starting contactor 59 attracts and connects the exciter generator 38 to the battery. The exciter generator 38 operates as a series-wound motor and starts the diesel motor.

After the diesel motor is actuated, the starting contact 58 is released, whereby the current supply to the starting contactor 59 is interrupted, and the contactor falls off. Thereby, also the battery current to the exciter generator 38 is interrupted. Thereupon, the control device 52 can be actuated which, for example, is shifted to the right so that first the positive contact of the control device is connected with contact 1. Thereby, the coil of contactor 60 receives current from the battery and attracts. The contactor 60 connects the exciter generator 38 with the stator winding 36 of the generator 35, as well as with the stator winding 32 of motor 10. By further switching the control device 52 by another step, the contact 2 of the control device has current applied thereto, whereby the coil of the contactor 61 is excited. The contactor 61 connects the shunt winding of the exciter generator 38 with the battery. The exciter generator thereupon generates a current which flows to the stator winding of the generator 35 and of the motor 10. At first, the current is still weak, as the number of rotations of the diesel motor is still low. The generator 35 commences operation and generates a current which flows to the rotor of the motor 10. However, there is as yet no moment of rotation effective upon the rotor of motor 10, because the rotor of the variable speed motor 30 does not as yet rotate.

By switching the control device 52 by a further step, the contact 3 of the control device is connected with the positive pole so that the shunt winding 31 of the variable speed motor 30 is connected to the battery. Simultaneously, the variable resistors 54 and 55 of the control device 52 have been connected with the battery so that also the rotor of the variable speed motor 30 receives current. The rotor starts to rotate and thus also rotates the brush arrangement 33 of the motor 10. Thereby, a moment of rotation is now effective upon the rotor of motor 10.

In this process, the variable speed motor, which has to overcome the opposing force of the tension springs 25 or 26 in addition to the frictional resistance of the brushes of the arrangement 33, must expend a certain amount of energy. The electromagnetic valve 41 is connected in series with the armature winding and has armature current flowing therethrough. The magnetic field of the electromagnetic valve 41 is thus strengthened because of the energy expended by motor 30, so that the valve opens farther and the fuel feed to the diesel motor is increased. The diesel motor thereby increases its number of rotations, the voltage of the generator 35 rises, the magnetic fields of motor 10 are strengthened, and thus the moment of rotation of motor 10 increases.

When the voltage at the variable speed motor 30 is further increased, the speed of rotation and the power of the diesel electric drive likewise increase. Once the voltage at the variable speed motor 30 has reached a constant value, the motor 10 being without load, or having a uniform load, the rotor of motor 10 tends to run ahead of the brushes 16, 17, 16', 17' so that the poles of the rotor better coincide with the poles of the stator having the opposite denomination.

Thereby, the brushes 16, 17, 16', 17' are, in turn, pulled more strongly into the neutral position by the springs 25 and 26, respectively. The armature of the variable speed motor 30 thereby has less counteracting force to overcome, so that the armature current decreases. Consequently, the valve 41 closes to a greater degree. Thereby, the number of rotations of the diesel motor is reduced, namely, when the brushes have again reached exactly their neutral position, until the number of rotations of the diesel motor corresponds to the armature current of the variable speed motor 30. The speed of rotation of the diesel motor is in this manner exactly adjusted to the load of the motor 10.

If, in case of right-hand rotation, the rotor of the motor 10 runs ahead of the brushes 16, 17, 16', 17' to such an extent that the brushes are pulled from the neutral position to the left, for example when using the drive in a downhill rolling vehicle, the number of rotations of the variable speed motor 30 is increased beyond its normal number of rotations. Thereby, the counter electromotive force of the variable speed motor 30 becomes higher than the terminal voltage. Therefore, the variable speed motor 30 runs as a generator and delivers a current which actuates the electromagnetic valve 41. The valve is opened wider, and the diesel motor receives a larger amount of fuel. Consequently, the speed of the diesel motor increases and the voltage of the generator 35 rises, while at the same time the magnetic fields of the motor 10 are strengthened. Thereby, a more perfect overlapping of the poles of equal denomination of rotor and stator of motor 10 results so that the motor is effective as a brake until the brushes 16, 17, 16', 17' have again been pulled back into their neutral position. This means that the variable speed motor 30 not only effects the speed control of the motor 10, but also the voltage control of generator 35.

In order to be able to operate with a low speed of rotation of motor 10 and increased voltage of generator 35, in case of difficult starting conditions, the potentiometer 42 is actuated such that the voltage at the electromagnetic valve 41 is increased and the valve is thereby opened wider.

The D.C. motor 10 can also be connected to any other D.C. source whose voltage can be controlled by the variable speed motor 30. The arrangement illustrated is independent of the direction of rotation of motor 10.

As already mentioned above, the generator can preferably be constructed in the same manner as the motor. In contradistinction to the motor, in the generator the commutator brushes must be fixedly connected with the rotor and aligned with respect to the center lines of the rotor poles. The excitation current is applied to the stator winding by way of one or two slip rings. The induced direct current is derived from the rotor by way of two slip rings and brushes. Such a generator, however, can only be operated with separate excitation, as the residual magnetism of the rotor poles does not induce any voltage in the stator winding, and the residual magnetism of the stator poles would induce an alternating current in the rotor winding. Just as in case of the motor, the rotor field in the generator likewise does not have any influence upon the exciter current in the stator winding and thus upon the commutation. In case of sudden strong changes in the load, or overload, the generator thus is not subjected to polarity reversal. The rotor winding is either fashioned to be an open winding, or the pole windings are connected in parallel. The generator in this case is operated as an external pole machine.

Figure 4:
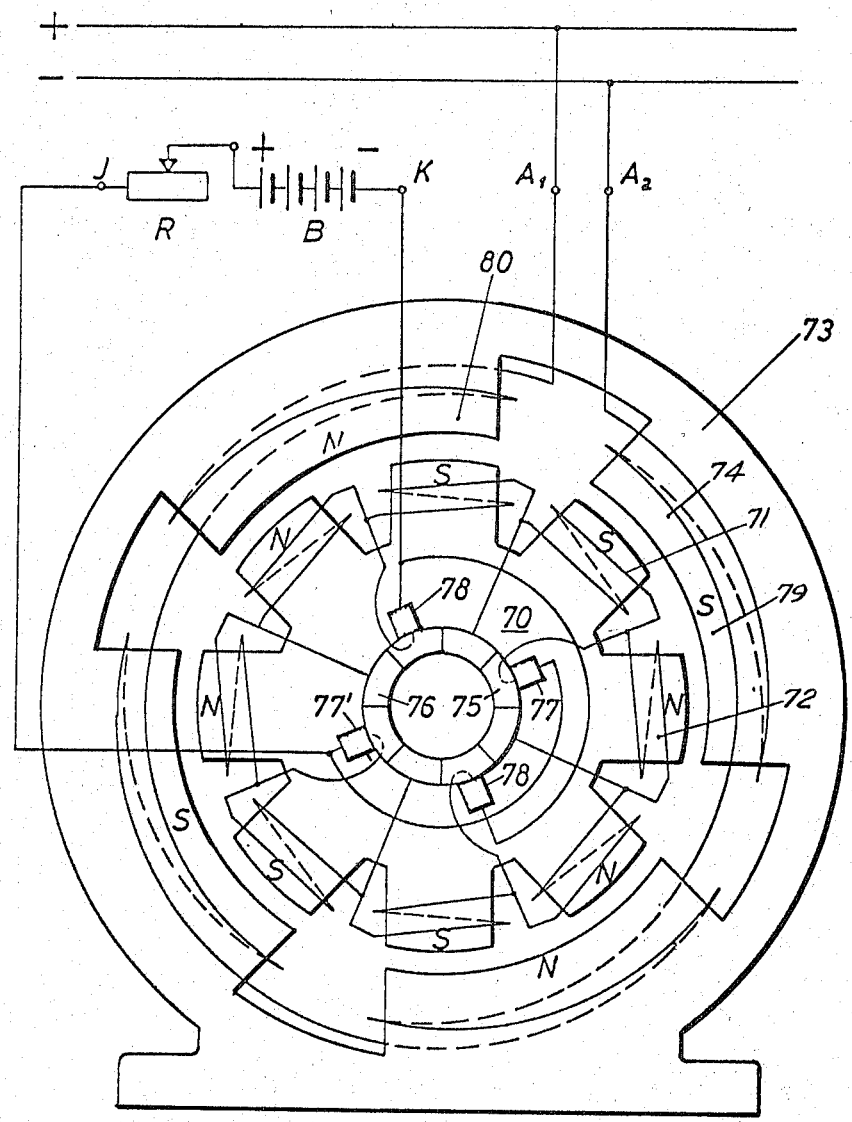
FIG. 4 is a schematic view of a D.C. generator to be used for the diesel electric drive of FIG. 3, this generator being constructed as an inner-pole machine with separate excitation.

In a preferred embodiment of the drive system, there is, however, the generator constructed as an inner pole machine. As shown in FIG. 4, the exciter winding 71, 72 is in this case, provided within the rotor 70, and the induced direct current is derived from the winding 74 of the stator 73. The commutator 75, divided into segments 76, is fixedly connected with the rotor 70, as in case of the normal D.C. generator. The brushes 77, 77' and 78, 78' are in fixed relationship with the stator poles 79, 80 and are aligned with respect to the center lines of the stator poles. The generator is operated with separate excitation, as in this case, too, the residual magnetism of the stator poles cannot produce any voltage in the rotor poles; the stator field has no influence upon the excitation current and upon the commutation. If, in the generator, the battery B with the control device R contacts the terminals $A_1$ and $A_2$ and sets the generator into rotation, no current can be derived at the terminals J and K. The advantage of the generator resides in that the induced direct current can be derived directly from the ends of the winding of the stator.

FIG. 5 shows the connection of the generator of FIG. 4 and the motor of FIG. 1 provided in the preferred embodiment of the drive of FIG. 3. The stator winding 74 of the generator and the rotor winding 82 of the motor are fashioned as open windings and are connected in such a manner that both windings form a circuit. For this purpose, only two slip rings 83, 84 and two brushes 85, 86 are required. In the rotor winding 82 of the motor, a counter electromotive force is induced, while the rotor 18 is rotating, this force opposing the voltage of the generator and thus controlling the amperage in the circuit.

In the drawing of FIG. 5, the generator and the motor are illustrated for right-hand rotation. The commutator is stationary in the motor, while the brushes are rotatable. In contradistinction thereto, in the D.C. generator, the commutator is rotatable and the brushes are stationary.

Obviously, many modifications and variations of the invention as hereinabove set forth can be made without departing from the essence and scope thereof, and only such limitations should be applied as are indicated in the appended claims.

I claim:

1. A D.C. shunt motor, comprising a stator (11) having poles (12) physically arranged in a circle and a rotor having poles (18) physically arranged in a circle concentric with the circle of stator poles, the rotor mounted rotatably with respect to the stator, the rotor poles moving into and out of alignment with the stator poles during rotor rotation, the number of stator poles equaling an integral multiple of the number of rotor poles, and means to create magnetic fields in the rotor and stator poles such that, when a rotor pole is aligned with a stator pole, their mutually opposing faces have the same magnetic polarity, while the next stator pole in the rotation direction has a magnetic polarity opposite to that of the aligned poles and the next stator pole in the direction opposite to the rotation direction has the magnetic polarity of the aligned poles;

the means to create magnetic fields including coil units wound on said stator poles and serially connected into an electrically closed loop, each connection between two neighboring stator coil units being connected to its own sector (13, 14) of a stationary commutator, the sectors of the commutator being physically arranged on a circle coaxial with the circle of stator poles, a current source, first and second slip rings (19, 20) rotatably mounted relative to the stator and the rotor, coaxially with the circle of stator poles, the first of the slip rings electrically connected to one pole of the current source, the second of the slip rings electrically connected to the other pole of the current source, brush arms (16, 17, 16', 17') connected to the slip rings and carrying brushes in wiping contact with the commutator, the number of brush arms equaling the number of rotor poles, the brush arms being spring (15, 26) biased in neutral positon, stops (23, 24) mounted on the rotor symmetrically on either side of the neutral positions in the path of movement of the brush arms, thereby limiting the rotational movement of the brush arms relative to the rotor, and a variable speed control motor (30) drivingly connected to the brush arms.

2. A D.C. shunt motor as claimed in claim 1, there being a stop placed symmetrically on each side of the neutral position of every brush arm.

3. The D.C. motor of claim 1 including a control device means for controlling the generation of electric current for driving the D.C. motor wherein the variable speed motor is a shunt-wound electric motor having a rotor connected in series with said control device.

4. The D.C. motor of claim 3 including a variable resistor with two oppositely adjustable sections, one of which sections is connected in series with said control device and the other of which sections is connected, together with a compensating resistor, in parallel with the control device, whereby the total resistance in the rotor circuit of the variable speed motor is maintained constant.

References Cited

UNITED STATES PATENTS

| | | | |
|---|---|---|---|
| 977,821 | 12/1910 | Milch | 318—439 XR |
| 2,478,440 | 8/1949 | Watson | 318—439 XR |
| 2,501,360 | 3/1950 | Strong | 290—22 XR |
| 2,859,397 | 11/1958 | Bolander | 318—541 XR |
| 3,271,579 | 9/1966 | Erismann | 290—38 XR |

FOREIGN PATENTS

| | | |
|---|---|---|
| 612,016 | 11/1948 | Great Britain. |
| 504,170 | 4/1929 | Germany. |

ORIS L. RADER, *Primary Examiner.*

G. SIMMONS, *Assistant Examiner.*

U.S. Cl. X.R.

318—491, 361, 541; 290—46